April 6, 1954     C. L. JOHNSON     2,674,420
ANTENNA INSTALLATION
Filed May 6, 1949     2 Sheets-Sheet 1
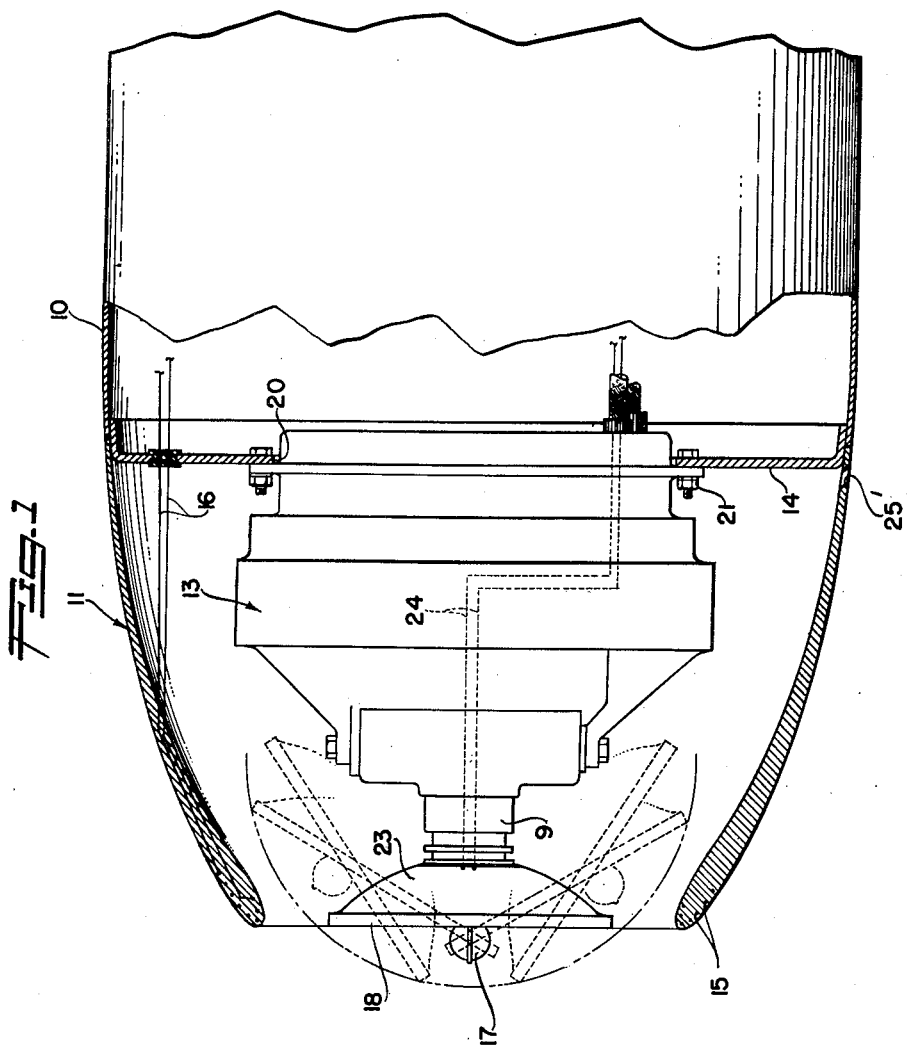
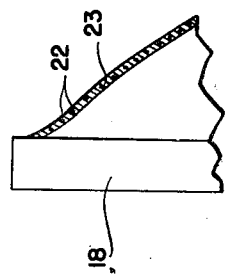
INVENTOR.
CLARENCE L. JOHNSON
BY
*George L. Sullivan*
Agent April 6, 1954
C. L. JOHNSON
2,674,420
ANTENNA INSTALLATION
Filed May 6, 1949
2 Sheets-Sheet 2
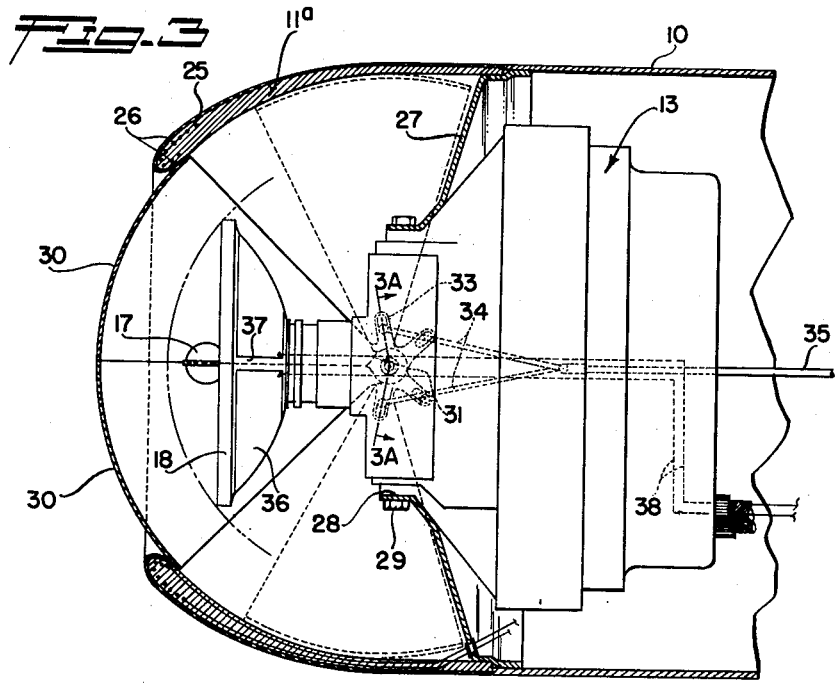
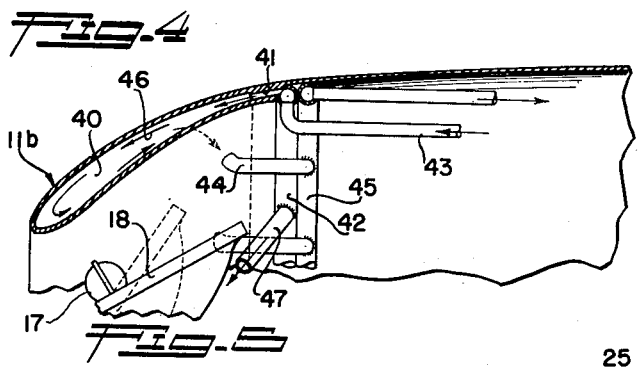
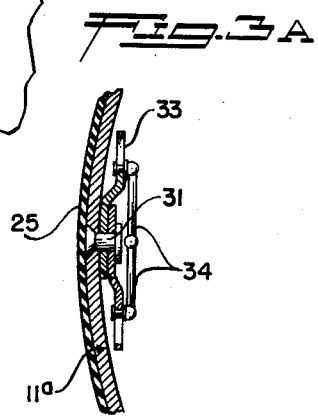
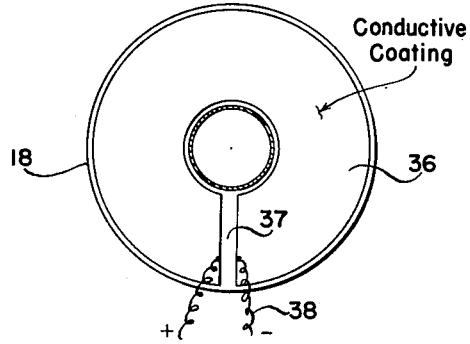
*INVENTOR.*
CLARENCE L. JOHNSON
BY
*George A. Sullivan*
Agent Patented Apr. 6, 1954

2,674,420

UNITED STATES PATENT OFFICE 2,674,420

ANTENNA INSTALLATION

Clarence L. Johnson, Encino, Calif., assignor to Lockheed Aircraft Corporation, Burbank, Calif.

Application May 6, 1949, Serial No. 91,790

4 Claims. (Cl. 244—1)

This invention relates to the installation and mounting of antennas and relates more particularly to means for mounting radar antennas, and the like, on aircraft.

Radar antennas as customarily installed in military airplanes are enclosed within protective housings or nose fairings, generally termed "radomes." These radomes must be constructed of a material that is "transparent" to radar energy, that is a material capable of transmitting such energy with a minimum of loss or attenuation. This requirement excludes the possibility of employing metals and the radomes are usually made of laminated plastics having the necessary radar transmitting characteristics. The plastic material radomes are extremely expensive to manufacture and are very heavy and, therefore, undesirable for aircraft use. The plastic laminates of the radomes, although selected for their radar transmitting ability, produce a considerable loss of energy because they are not entirely transparent to the micro-waves of radar transmission. The plastic material radomes are also difficult to de-ice. Another disadvantage, or limitation, of the plastic laminate type radome is its susceptibility to rain erosion during high speed flight, the expensive radomes being quickly eroded by rain at near sonic, sonic and supersonic speeds of flight.

It is a general object of my present invention to provide a simple, inexpensive means or structure for mounting aircraft radar antennas that permits or assures optimum radar energy transmission and reception. In accordance with the invention, the oscillating and rotating radar antenna is "uncovered" or directly exposed to receive and transmit the micro-wave radar energy without loss. The invention provides for the arrangement of the antenna in the forward portion of an annular hollow cowl-like nose having an open forward end so that the radar reflector "dish" and antenna are, in effect, unconfined so far as radar reception and transmission are concerned.

Another object of the invention is to provide an antenna installation of the character referred to that is light in weight and readily de-iced. The invention obviates the necessity for the heavy thick-walled radome thereby materially reducing the over-all weight of the installation and the radar reflector and antenna assembly is located in a quiescent area or zone where it is not subject to excessive icing. The abovementioned cowl-like nose is closed at its rear end by an air seal to reduce or control airflow around the antenna to a minimum, thereby avoiding excessive icing of the antenna although adequate provision is made for de-icing of the antenna. Means may also be provided for de-icing the leading edge portion of the open-ended nose. Where there is a minimum of airflow around the antenna there is little resistance to its oscillation and rotation and the forces or power required to operate the moving antenna are held at a minimum.

A further object of the invention is to provide a radar antenna installation of the class referred to in which the antenna may be fully protected when desired. The invention includes closure means for closing off the forward end of the open nose to protect the antenna and antenna operating mechanism during taxiing, takeoff and landing operations and at other times when the antenna is not in use.

Other features and objectives of the invention will become apparent from the following detailed description of typical preferred embodiments throughout which description reference is made to the accompanying drawings in which:

Figure 1 is a longitudinal sectional view of one form of installation of the invention with the antenna and antenna operating mechanism appearing in elevation and with various positions of the antenna appearing in broken lines;

Figure 2 is an enlarged fragmentary elevational view of the antenna reflector of Figure 1 showing the electric de-icing boot in cross-section;

Figure 3 is a view similar to Figure 1 illustrating another form of the invention and showing the closures in the closed position;

Figure 3A is a fragmentary sectional view taken as indicated by line 3A—3A on Figure 3;

Figure 4 is a fragmentary sectional view illustrating still another arrangement employing heated air as a de-icing medium, and Figure 5 is a rear elevation of the antenna reflector shown in Figure 3 illustrating the conductive coating for de-icing the same.

The invention is capable of considerable variation and modification to adapt it for employment in given aircraft and it is to be understood that the structures shown in the drawings and hereinafter described, are typical and illustrative and are not to be taken as limiting either the scope or application of my invention.

In Figure 1, I have shown a portion 10 of an airplane which may be the forward part of the fuselage, a nacelle, a member supported from the tip or leading edge part of a wing, or other portion of the aircraft. This airplane portion 10 may be considered as being generally circular or round in cross-section and is streamlined to gradually diminish in diameter in the forward direction. A nose 11 is provided on the airplane part 10 to continue forwardly therefrom. The nose 11 preferably smoothly merges with the part 10 and its external surface converges or curves inwardly and forwardly, the particular configuration of the nose 11 being dependent upon the over-all aerodynamic conditions or factors involved in the given airplane design. In accordance with the invention, the forward end of the nose 11, which is somewhat reduced in diameter, is open, the nose being in the nature of a hollow or tubular shell for surrounding the antenna assembly and its operating mechanism 13. The rear or inner portion of the nose 11 is closed to control or reduce the airflow around the antenna assembly. In the particular construction illustrated, a bulkhead or air seal 14 is arranged across the inner or rear portion of the nose 11 and serves to support the radar antenna operating mechanism 13, the air seal 14 and the mechanism 13 operating to close off the inner or rear end of the nose 11, it being apparent that other appropriate means may be employed to seal off the rear portion of the nose. By closing off or sealing the inner end of the nose 11, the flow of air through the nose is reduced or practically eliminated so that there is a relatively quiescent air region within the nose and extending some distance forwardly from the nose, the main air stream passing around the exterior of the streamlined nose.

As will be later apparent, it is desirable to construct the nose 11 of a material that is capable of transmitting radar waves with a minimum of loss or attenuation for the most efficient radar transmission and reception. In this connection, it is important to avoid the use of metal in the construction of the nose 11 and particularly in the forward portion of the nose which is called upon to transmit the radar waves. In practice, the nose 11 may be formed of a plastic material, a plastic material laminate, or a fibre-glass fabric-plastic laminate, the latter having been found to have excellent radar transmitting characteristics coupled with high strength. In Figure 1, I have shown the leading edge portion of the nose 11 somewhat thickened in cross-section to improve its aerodynamic configuration although both the radar transmission and the aerodynamic considerations must be taken into account in designing the nose for use in a given radar antenna installation. In order to improve the radar transmitting ability and to reduce the weight of the nose 11, the leading or forward portion of the nose may be made hollow as in the form of the invention illustrated in Figure 4.

In order to prevent the accumulation of ice on the nose 11, it is desirable to provide de-icing means for the leading portion of the nose. In the form of the invention illustrated in Figure 1, this means comprises an electrical resistance wire or heating wire 15 or a conductive coating embedded in or over the material of the nose 11. The de-icing wire 15 is embedded in the nose 11 adjacent the surface of its leading edge and has appropriate lead-in wires 16 extending rearwardly through the nose to a suitable electrical source (not shown) in the aircraft.

The present invention is not primarily concerned with the construction or specific details of the radar antenna apparatus and I have illustrated only one form of such a mechanism in a more or less diagrammatic manner, it being understood that the invention is not to be construed as limited for use with this particular type of qeuipment. The radar apparatus shown in the drawings includes the antenna proper 17, the parabaloid or reflector 18 associated with the antenna, and the assembly or mechanism 13 for supporting and operating the antenna and reflector. The antenna 17 is centrally disposed in front of the dish-like parabolic reflector 18 and the two units or devices are carried by shaft means 9 extending forwardly from the operating mechanism 13. In this particular class of radar antenna apparatus the reflector 18 rotates on its own axis, rotating with respect to the antenna 17 and the reflector and antenna oscillate and wobble concurrently or together in scanning, searching and tracking.

In accordance with the invention, the parts are related so that the antenna 17 is adjacent, or slightly forward, or somewhat rearward, of the plane occupied by the forward open end of the nose 11 when the antenna is in the central position illustrated in full lines in Figure 1. The open forward end of the nose 11 is sufficiently large to allow the antenna 17 and the reflector 18 to be rotated, oscillated and directed as required, without interference. As will be apparent from an inspection of Figure 1, the nose 11 is constructed and arranged so that the antenna 17 and the reflector 18 are at all times exposed for the substantially unobstructed transmission and reception of the radar waves and energy when in any position, there being a considerable portion of the reflector extending beyond the confines of the shell 11 when in the tilted positions. Furthermore, when the nose 11, or at least the forward portion of the nose, is constructed of a material that is transparent to radar waves, there is only a slight loss of transmission when the radar and reflector unit is in the extreme angular positions. The loss in radar transmission and reception resulting from the antenna and reflector being in extreme and intermediate positions during general scanning and searching operations is not critical or important and when the enemy craft or other object being sought is being detected or located by the radar apparatus, the airplane will usually be directed toward that object. This brings the nose 11 and the radar antenna 17 in the relationship where the antenna and reflector 18 operate, either automatically or under manual direction, in the open forward end of the nose 11 so there is no loss whatsoever and full unobstructed transmission and reception of the radar waves is obtained. Thus there is adequate radar transmission and reception during the preliminary searching operations, etc., superior to the results obtained with the conventional radome installations where the antenna and reflector are completely enclosed in a structure producing substantial transmission losses and with the arrangement of the invention there is full transmission and reception during the more important tracking and/or homing operations.

While, as above pointed out, the antenna 17 and reflector 18 are within a relatively quiet region out of the principal air stream, it is preferred to provide means for de-icing the reflector 18. In the arrangement illustrated in Figures 1 and 2, the de-icing means includes an electric resistance wire or heating wire 22 sheathed in or carried by a suitable dielectric boot 23 applied to the rear surface of the reflector 18. The electric leads 24 for the de-icer may be associated with the shaft means 9 of the radar operating mechanism 13. One or more drain ports 25' may be provided in the lower rear portion of the nose 11 to permit the escape of water that might otherwise collect in the nose.

Figure 3 illustrates another form of the invention embodying a nose 11a similar to the above described nose 11. The nose 11a may be formed of the same material as the nose 11 and is provided on its outer surface with a relatively thin layer or sheath 25 of yielding synthetic rubber, or the like. The yielding sheath 25 protects the nose 11a against injury and erosion during high speed flight in rain, the sheath 25 absorbing the impact of the water drops to prevent erosion of the nose. The de-icing means for the leading edge portion of the nose 11a may comprise an electric resistance wire 26 similar to the de-icing means 15 described above. In this form of the invention the bulkhead or air seal 27 extends forwardly and inwardly from the airplane part 10 and its central opening 28 is flanged to encircle the operating mechanism 13. As illustrated, the forward portion of the mechanism 13 may be suitably secured in the opening 28 by bolts or screws 29 so that the major portion of the mechanism is protected behind the bulkhead or air seal 27. As in the previously described form of the invention, the forward end of the nose 11a is open and the antenna 17 and the reflector 18 are free to operate in the forward part of the nose without interference.

The structure of Figure 3 includes a closure means adapted to close the forward end of the nose 11a during taxiing, takeoff and landing operations and at other times when the radar equipment is not in use, the closure means serving to protect the radar equipment against injury by birds, etc. The closure means includes hinged closures 30 movable between positions where they close the opening in the forward end of the nose 11a and open positions where they are clear of the opening and out of the range of movement of the reflector 18. The closures 30 are pivoted or hinged to the nose 11a at their opposite sides by horizontally aligned hinge pins 31. Lever arms 33 project from the closures 30 adjacent their hinge mountings and links 34 connect the lever arms with an operating rod 35 which may extend to manual or power closure operating means in the airplane.

The radar reflector 18, as employed in Figure 3, may carry the electric de-icer means 22—23 described above. However, Figure 5 illustrates another means that may be utilized to de-ice the reflector in the arrangement of Figure 3. This means comprises a coating 36 of electrically conductive material. The coating 36 substantially covers the entire rear surface of the reflector 18 being in the nature of a broad band or stripe whose ends are separated by a relatively narrow gap 37. Electrical leads 38 are connected with the coating 36 at opposite sides of the gap 37 so that a current may flow through the coating from one end to the other. The coating 36 may comprise finely divided carbon, or the like, carried by a suitable water resistant or waterproof lacquer or plastic. The coating 36 has an electrical resistance value that causes it to become heated when the current flows through it.

Figure 4 illustrates still another form of de-icing means that may be employed to de-ice the nose 11b and the reflector 18. In this construction the nose 11b is hollow, having an internal space or chamber 40. The chamber 40 may be continuous and annular to extend throughout the ring-like or tubular nose. The rear end of the chamber 40 has circumferentially spaced ports 41 extending rearwardly to communicate with an annular manifold 42. The manifold 42 in turn communicates with a supply duct 43 which delivers heated air under pressure to the de-icing system. Discharge tubes 44 lead from chamber 40 of the nose 11b to an annular exhaust manifold 45. The arrows 46 in Figure 4, illustrate the manner in which the heated air circulates from the ports 41 through the internal space or chamber 40 of the nose 11b to return or discharge through the ducts 44 to effectively de-ice the nose. The hollow relatively thin-walled nose 11b may be more effective in the transmission of the radar wave energy than the solid-section type noses. A number of circumferentially spaced jets 47 extend forwardly and inwardly from the heated air supply manifold 42 to direct streams of the heated air against the reflector 18. The jets 47 are constructed and arranged to discharge the heated air in the path taken by the rotating and oscillating reflector 18 so that the reflector and the antenna 17 are de-iced as they move about in the nose 11b.

From the foregoing detailed description it will be seen that I have provided a simple, inexpensive and light-weight installation for the radar antennas of aircraft. The invention obviates the need for the heavy and expensive radomes and serves to support the radar antenna 17 and the reflector 18 in such a manner that there is a minimum of transmission loss. As above described, there is no loss due to transmission of the radar waves through radome walls, or the like, during the important tracking and homing operations and the antenna 17 and reflector 18 are operatively unconfined or clear at such times. During scanning and searching operations the transmission losses are less than those encountered where radomes are used because substantial portions of the reflector and/or antenna are free and unconfined at such times.

Having described only typical forms of the invention, I do not wish to be limited to the specific details herein set forth, but wish to reserve to myself any variations or modifications that may appear to those skilled in the art and fall within the scope of the following claims.

I claim:

1. In an aircraft the combination of; a radar antenna and reflector and mechanism for moving the same, a cowl attached to the aircraft and having an open forward end relative to the direction of flight, the cowl being formed of a material that is substantially transparent to radar energy, a wall closing the rear portion of the cowl to substantially prevent axial airflow trhough the cowl and thereby create a relatively quiescent air region in the forward open portion of the cowl and for some distance ahead of the open forward end of the cowl, and means for mounting said mechanism on the wall so that the major portion of said mechanism is behind the wall and so that the antenna and reflector operate in and adjacent the plane of the open forward end of the cowl.

2. An aircraft structure including a tubular nose section extending forwardly relative to the direction of flight, the forward end of the tubular nose section being unobstructed and open to the atmosphere, the nose section comprising a wall which converges forwardly to its said open forward end, a bulkhead for closing the rear portion of the tubular nose section to substantially eliminate axial air flow through the nose and thereby create a region of quiescent air in the nose and ahead of said forward end of the nose, radar scanning apparatus, and a scanner driving mechanism in the nose supported on said bulkhead, said scanning apparatus carried by said mechanism and so located as to operate and to move in and adjacent the plane of said open end of the nose section where the air is quiescent.

3. An aircraft structure comprising a tubular fore and aft extending cowl section constructed of a material substantially transparent to radar energy and having its end which is forward relative to the direction of flight unobstructed and open to the atmosphere, a bulkhead closing the aft end of the cowl section to substantially prevent axial air flow through the cowl and thereby create a region of quiescent air in the cowl and ahead of its said open forward end, and a radar apparatus including scanner driving mechanism in the nose, and a movable antenna and a movable reflector both supported and operated by said mechanism to move and operate in and adjacent the plane of said open forward end of the cowl section where they are directly exposed to the atmosphere and where the air is substantially quiescent.

4. In an airplane structure the combination of; a tubular streamlined cowl extending in the fore and aft direction, the forward end of the cowl being open to the atmosphere, the forward portion of the cowl being constructed of material transparent to radar energy, a bulkhead extending across the interior of the tubular cowl in a plane spaced aft of said open forward end substantially preventing axial air flow through the forward portion of the cowl and thereby creating a relatively quiescent air region in the forward portion of the cowl and for some distance ahead of said open forward end of the cowl, a radar unit including a movable antenna means, and a driving mechanism in the cowl operating the radar unit to move in and adjacent the plane of said open end of the cowl where the air is quiescent, closure means carried by the cowl movable between positions where they close the forward end of the cowl and positions where they are clear of the open forward end of the cowl to leave said forward end unobstructed, and means for operating the closure means between said positions.

References Cited in the file of this patent

UNITED STATES PATENTS

| Number | Name | Date |
|---|---|---|
| 1,414,418 | Jaray | May 2, 1922 |
| 2,167,972 | Crawford | Aug. 2, 1939 |
| 2,196,819 | Vanetta | Apr. 9, 1940 |
| 2,199,971 | Sanders | May 7, 1940 |
| 2,358,257 | Schwab | Sept. 12, 1944 |
| 2,457,393 | Muffly | Dec. 28, 1948 |
| 2,494,368 | Steele et al. | Jan. 10, 1950 |
| 2,574,853 | Ward | Nov. 13, 1951 |

FOREIGN PATENTS

| Number | Country | Date |
|---|---|---|
| 504,360 | Great Britain | Apr. 21, 1939 |
| 585,074 | Great Britain | Jan. 29, 1947 |
| 871,408 | France | Jan. 15, 1942 |